United States Patent
Srivastava

(10) Patent No.: US 10,044,819 B2
(45) Date of Patent: Aug. 7, 2018

(54) NETWORK DELIVERY SYSTEM

(71) Applicant: INTERNATIONAL BUSINESS MACHINES CORPORATION, Armonk, NY (US)

(72) Inventor: Anurag Srivastava, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/398,234

(22) Filed: Jan. 4, 2017

(65) Prior Publication Data
US 2018/0191845 A1   Jul. 5, 2018

(51) Int. Cl.
H04L 29/08   (2006.01)
H04W 64/00  (2009.01)
H04W 88/02  (2009.01)

(52) U.S. Cl.
CPC .............. *H04L 67/18* (2013.01); *H04L 67/22* (2013.01); *H04L 67/24* (2013.01); *H04L 67/26* (2013.01); *H04L 67/306* (2013.01); *H04W 64/003* (2013.01); *H04W 88/02* (2013.01)

(58) Field of Classification Search
CPC ......... G06F 17/30194; G06F 17/30867; G06F 17/30017; G06F 17/30876; G06F 11/3438; G06Q 30/02; G06Q 30/0269; G06Q 10/063; G06Q 10/0639; G06Q 30/0205; G06Q 30/0267; H04L 67/18; H04L 67/306; H04L 67/22; H04L 67/24; H04L 67/26; H04W 64/003; H04W 88/02
See application file for complete search history.

(56) References Cited

U.S. PATENT DOCUMENTS

| | | | |
|---|---|---|---|
| 8,644,813 B1* | 2/2014 | Gailloux | H04W 24/08 455/115.1 |
| 2008/0077952 A1* | 3/2008 | St. Jean | G06Q 30/02 725/32 |
| 2009/0013052 A1* | 1/2009 | Robarts | G06F 17/30867 709/206 |
| 2012/0047022 A1* | 2/2012 | Shamim | G06Q 30/0269 705/14.66 |
| 2012/0278173 A1 | 11/2012 | Vaidyanathan et al. | |
| 2013/0185137 A1 | 7/2013 | Shafi et al. | |
| 2014/0066046 A1* | 3/2014 | Keshavdas | H04W 4/20 455/419 |
| 2015/0350371 A1* | 12/2015 | Woods | H04L 67/2852 707/620 |
| 2016/0086241 A1 | 3/2016 | Proulx | |

* cited by examiner

*Primary Examiner* — Thai Vu
(74) *Attorney, Agent, or Firm* — Schmeiser, Olsen & Watts; Nicholas Bowman

(57) ABSTRACT

A method and system for improving network delivery is provided. The method includes receiving an Internet based event for a user. The Internet based event is associated with user attributes, of the user, retrieved from a specialized network and it is determined that the user is associated with the Internet based event. A functionality status of a mobile hardware device of the user is determined and current parameters of the user and current characteristics of the user are analyzed. Resulting network based delivery options associated with the Internet based event for the user are determined.

14 Claims, 5 Drawing Sheets

NETWORK DELIVERY SYSTEM

FIELD

The present invention relates generally to a method for delivering electronic events to a user via a network and in particular to a method and associated system for improving network technology by determining network based delivery options associated with an Internet based event for a user.

BACKGROUND

Accurately receiving electronic notifications typically includes an inaccurate process with little flexibility. Determining user location and associated conditions with respect to electronic notifications may include a complicated process that may be time consuming and require a large amount of resources. Accordingly, there exists a need in the art to overcome at least some of the deficiencies and limitations described herein above.

SUMMARY

In one embodiment, the present invention provides a specialized network delivery improvement method comprising: receiving, by a processor of a hardware device, an Internet based event for a user; associating, by the processor, the Internet based event with user attributes, of the user, retrieved from a specialized network; determining, by the processor based on results of the associating, that the user is associated with the Internet based event; determining, by the processor, a functionality status of a mobile hardware device of the user; analyzing, by the processor via a sensor circuit of the mobile device of the user, current parameters of the user and current characteristics of the user; and determining, by the processor based on results of the determining the functionality status and the analyzing the current parameters of the user and the current characteristics of the user, network based delivery options associated with the Internet based event for the user.

In another embodiment, the present invention provides a computer program product, comprising a computer readable hardware storage device storing a computer readable program code, the computer readable program code comprising an algorithm that when executed by a processor of a hardware device implements a specialized network delivery improvement method, the method comprising: receiving, by the processor, an Internet based event for a user; associating, by the processor, the Internet based event with user attributes, of the user, retrieved from a specialized network; determining, by the processor based on results of the associating, that the user is associated with the Internet based event; determining, by the processor, a functionality status of a mobile hardware device of the user; analyzing, by the processor via a sensor circuit of the mobile device of the user, current parameters of the user and current characteristics of the user; and determining, by the processor based on results of the determining the functionality status and the analyzing the current parameters of the user and the current characteristics of the user, network based delivery options associated with the Internet based event for the user.

In another embodiment, the present invention provides a hardware device comprising a processor coupled to a computer-readable memory unit, the memory unit comprising instructions that when executed by the processor implements a specialized network delivery improvement method comprising: receiving, by the processor, an Internet based event for a user; associating, by the processor, the Internet based event with user attributes, of the user, retrieved from a specialized network; determining, by the processor based on results of the associating, that the user is associated with the Internet based event; determining, by the processor, a functionality status of a mobile hardware device of the user; analyzing, by the processor via a sensor circuit of the mobile device of the user, current parameters of the user and current characteristics of the user; and determining, by the processor based on results of the determining the functionality status and the analyzing the current parameters of the user and the current characteristics of the user, network based delivery options associated with the Internet based event for the user.

The present invention advantageously provides a simple method and associated system capable of accurately receiving electronic notifications.

DETAILED DESCRIPTION

Figure 1:
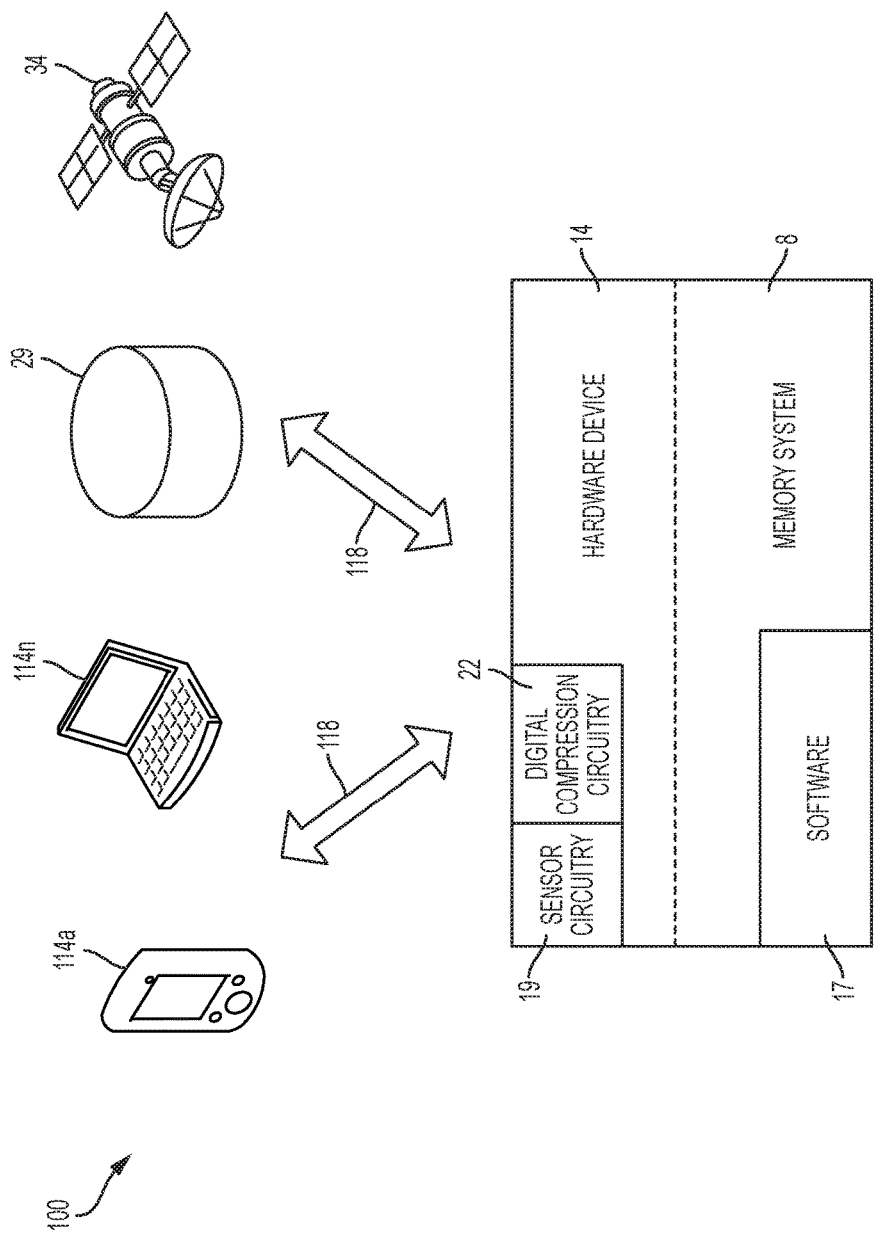
FIG. 1 illustrates a system for aggregating and digitally compressing multiple electronic events for network transmission, in accordance with embodiments of the present invention.

FIG. 1 illustrates a system 100 for aggregating and digitally compressing multiple electronic events for network transmission, in accordance with embodiments of the present invention. System 100 enables a process for improving network technology by determining network based delivery options associated with an Internet based event for a user. The network based delivery options may be determined based on current parameters and current characteristics of a user of a mobile (hardware) device (e.g., mobile devices 114a . . . 114n). Parameters and current characteristics of a user may include, inter alia, mood parameters of the user, a current geographical location of the user, current vital sign readings of the user, current monetary attributes of the user, recent purchase history of the user, etc. Additionally, the network based delivery options may be determined based on functionality status of the mobile device of the user. A functionality status may indicate, inter alia, a weak signal associated with communications between the mobile device and a (controller) hardware device 14, a low memory status of a memory device within the mobile device, a hardware malfunction associated with the mobile device, etc. System 100 is enabled to determine that a user may utilize electronic events at a later time via analysis of factors such as, inter alia, a functionality status of a mobile device (e.g. signal strength, a memory status, a hardware or software malfunction, etc.), a user location determined via a satellite signal, a current time, context, user physical characteristics (e.g., a specified pulse rate, a specified user temperature, etc.), etc. Associated electronic alerts are generated for the user in response to receiving a current state (of the user and/or electronic mobile device of the user) and user location. Electronic events may include advertisements, coupons, discounts, hardware/software repair functions, etc.

System 100 of FIG. 1 includes mobile devices 114*a* . . . 114*n*, a remote database 29, and a satellite system 34 in communication with a hardware device 14 via a network 118. Mobile devices 114*a* . . . 114*n* and hardware device 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, mobile devices 114*a* . . . 114*n* and hardware device 14 may each comprise a specialized hardware device(s) comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as an application specific integrated circuit (ASIC) designed for only implementing an automated process for aggregating and digitally compressing multiple electronic events for network transmission. Hardware device 14 includes a memory system 8, software 17, sensor circuitry 19 (all sensors (e.g., heartrate monitors, optical sensors, ultrasonic sensors, temperature sensors, electronic signal sensors, etc.), interfaces, and associated control hardware for enabling software 17 to communicate with mobile devices 114*a* . . . 114*n* and execute a process for aggregating for network transmission), and digital compression circuitry 22 (all circuitry for enabling software 17 to digitally compress and encrypt multiple electronic events for network transmission). Additionally, digital compression circuitry 22 may comprise a multiplexer circuit and a de-multiplexer circuit for switching between digital signals associated with the events. The memory system 8 may include a single memory system. Alternatively, the memory system 8 may include a plurality of memory systems. Mobile devices 114*a* . . . 114*n* may comprise any type of hardware devices (comprising embedded circuitry for only performing an automated process for aggregating and digitally compressing multiple electronic events for network transmission) such as, inter alia, smart phones, Internet of things (TOT) devices, wearable devices, etc. Mobile devices 114*a* . . . 114*n* may comprise sensor circuitry (e.g., all sensors (e.g., heartrate monitors, optical sensors, ultrasonic sensors, temperature sensors, electronic signal sensors, etc.) for monitoring characteristics and parameters of a user.

System 100 allows delivered (to a user via a mobile device) electronic events to be stored for future use when it is determined that the user may have high probability of using the delivered electronic events. System 100 may comprise a cloud service interacting with mobile devices 114*a* . . . 114*n* to aggregate and digitally compress electronic events for delivery to users via multiple channels. The cloud service may include an algorithm to match a user's current parameters (e.g., mobile device functionality status, a user geographical location, current user vital sign readings, current mood or physical body parameters, current interests, browsing history, etc.) determined via sensor circuit 19 with the aggregated and compressed electronic events to select electronic events that are useful for the user. Additionally, the cloud service may include an analytical engine that analyzes a mobile device of the user to determine (via sensor circuitry 19 and additional sensor circuitry within the mobile device) a current functionality status of the hardware device 14. Additionally, the analytical engine may be enabled to classify the aggregated and compressed electronic events with respect to various categories such as, inter alia, food categories, health categories, electronics categories, etc. The analytical engine may further monitor electronic events with respect to expiration dates, correlations with additional electronic events, etc. The user's current parameters may be retrieved from the user's mobile device.

Aggregated electronic events may be implemented with respect to the following use cases:

1. Aggregated electronic events may be used as inputs for route suggestions with respect to retrieving directions from online map applications.
2. Aggregated electronic events may be displayed with respect to online directions (e.g., maps) for travel planning.
3. Aggregated electronic events may be used with respect to GPS systems to track a user's coordinates to indicate utilization of the electronic events from a nearby location.
4. Aggregated electronic events may be used as input for analysis of a user's current condition.

System 100 is configured to operate with respect to the following two modes:

1. A self-delivery mode such that a user device (e.g., a wearable device, a mobile device, etc.) transmits a current state (e.g., an operational state) and associated current geographical coordinates to an aggregation system operating on a cloud system.
2. A request mode such that a user enters interest inputs and transmits the inputs to an aggregation system operating on a cloud system.

System 100 may be configured to operate via cellular phone circuitry in combination with a cloud system. The cloud system allows a user to register and create a profile such that communications with the cellular phone circuitry enable a process for continuously analyzing user behavior and internal operational characteristics for generating user electronic events. The following process describes an implementation example for generating aggregated electronic events for a user:

A user registers with a cloud system and creates an associated profile. The cloud system enables specified memory space for storing user electronic events and messages. Subsequently, the user receives a personalized event (e.g., via hardware device 14) and the hardware device 14 analyzes the event with respect to the user profile. In response, it is determined that the event should not be presented to the user at a current time (e.g., due to: a functionality status of the smart phone, current characteristics of the user, etc.). The event is stored for delivery at a later time. After multiple electronic events are received via the hardware device 14, the electronic events are aggregated and digitally compressed (by digital compression circuit) for delivery in response to an acceptable functionality status of the hardware device 14 determined by sensor circuit 19 and an acceptable characteristic status of the user determined by sensor circuit 19. The aggregated electronic events are delivered to the user and decoded for presentation to the user.

Figure 2:
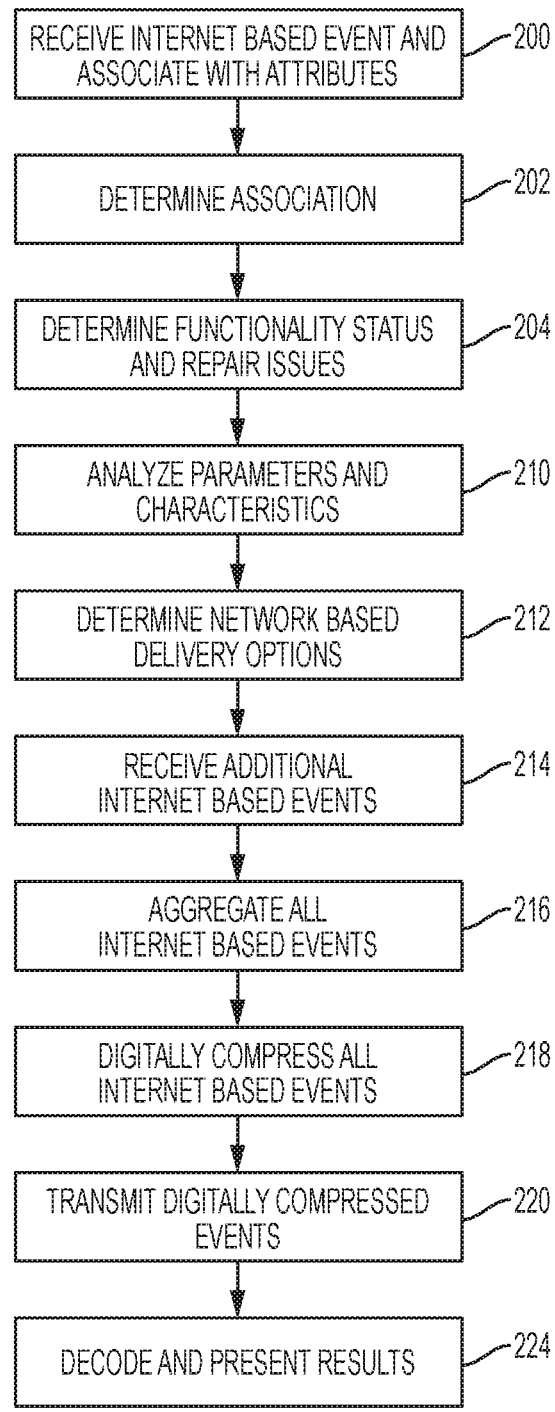
FIG. 2 illustrates an algorithm detailing a process flow enabled by the system of FIG. 1 for aggregating and digitally compressing multiple electronic events for network transmission, in accordance with embodiments of the present invention.

FIG. 2 illustrates an algorithm detailing a process flow enabled by system 100 of FIG. 1 for aggregating and digitally compressing multiple electronic events for network transmission, in accordance with embodiments of the present invention. Each of the steps in the algorithm of FIG. 2 may be enabled and executed in any order by a computer processor(s) or any type of specialized hardware executing computer code. In step 200, a hardware device (e.g., hardware device 14 of FIG. 1) receives an Internet based electronic event for a user. The Internet based electronic event is associated with user attributes (of the user) retrieved from a specialized network or database. In step 202, it is determined (based on the association of step 200) that the user is associated with the Internet based electronic event. In step 204, a functionality status of a mobile hardware device of the user is determined. A functionality status may indicate, inter alia, a weak signal associated with communications between the mobile device and the hardware device, a low memory status of a memory device within the mobile device, a hardware malfunction associated with the mobile device, etc. Additionally, the functionality status may initiate a repair process for automatically repairing issues indicated by the functionality status. For example:

1. If a weak communication signal is indicated, a signal strength (of the mobile device and/or the hardware device) may be boosted or amplified.
2. If a low memory status of a memory device within the mobile device is indicated, a portion of the memory device may be cleared or data may be deleted.
3. If a hardware and/or software malfunction associated with the mobile device is indicated the malfunction may be repaired remotely.

In step 210, current parameters and current characteristics of the user are retrieved and analyzed via a sensor circuit of the mobile device and or the hardware device. Parameters and current characteristics of a user may include, inter alia, mood parameters of the user, a current geographical location of the user, current vital sign readings of the user, current monetary attributes of the user, recent purchase history of the user, etc. In step 212, network based delivery options associated with the Internet based electronic event for the user are determined based on the results of steps 204 and 210. In step 214, additional internet based electronic events (for the user) are retrieved from a remote database. In step 216, the Internet based electronic event is aggregated with additional internet based electronic events resulting in an aggregated event package. In step 218, the aggregated event package is digitally compressed and optionally encrypted. In step 220, the digitally compressed (and encrypted) aggregated event package is transmitted to the mobile device via the specialized network. In step 224, digitally compressed aggregated event package is decoded (and decrypted) and delivered for presentation to said user via the mobile device. The presented information includes all events within the aggregated event package such as, inter alia, advertisements, coupons, discounts, hardware/software repair functions. Additionally, the presented information includes parameters and current characteristics of the user such as, inter alia, mood parameters of the user, a current geographical location of the user, current vital sign readings of the user, current monetary attributes of the user, recent purchase history of the user, etc.

Figure 3:
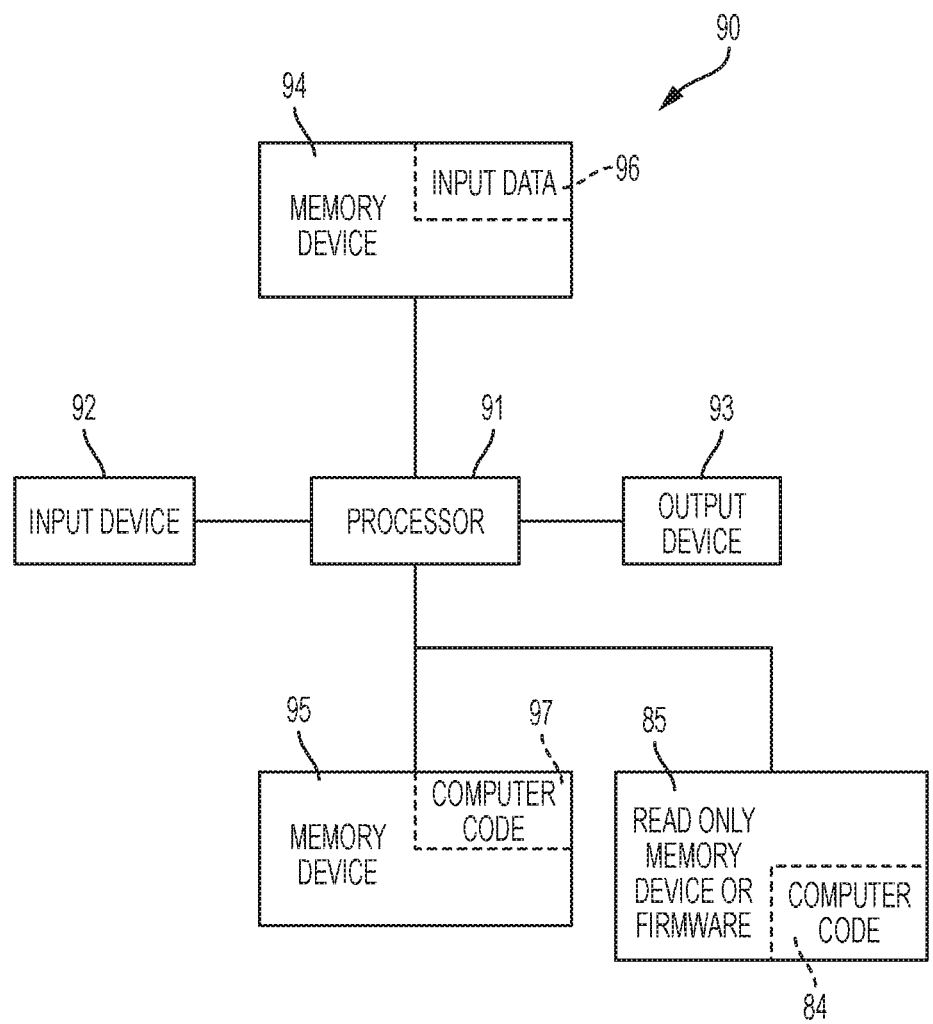
FIG. 3 illustrates a computer system used by the system of FIG. 1 for enabling a process for aggregating and digitally compressing multiple electronic events for network transmission, in accordance with embodiments of the present invention.

FIG. 3 illustrates a computer system 90 (e.g., mobile devices 114a . . . 114n and hardware device 14) used by or comprised by the system of FIG. 1 for aggregating and digitally compressing multiple electronic events for network transmission, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for aggregating and digitally compressing multiple electronic events for network transmission. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for aggregating and digitally compressing multiple electronic events for network transmission. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for aggregating and digitally compressing multiple electronic events for network transmission. In another embodiment, the invention provides a business method that performs the process steps of the invention on a subscription, advertising, and/or fee basis. That is, a service supplier, such as a Solution Integrator, could offer to enable a process for aggregating and digitally compressing multiple electronic events for network transmission. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
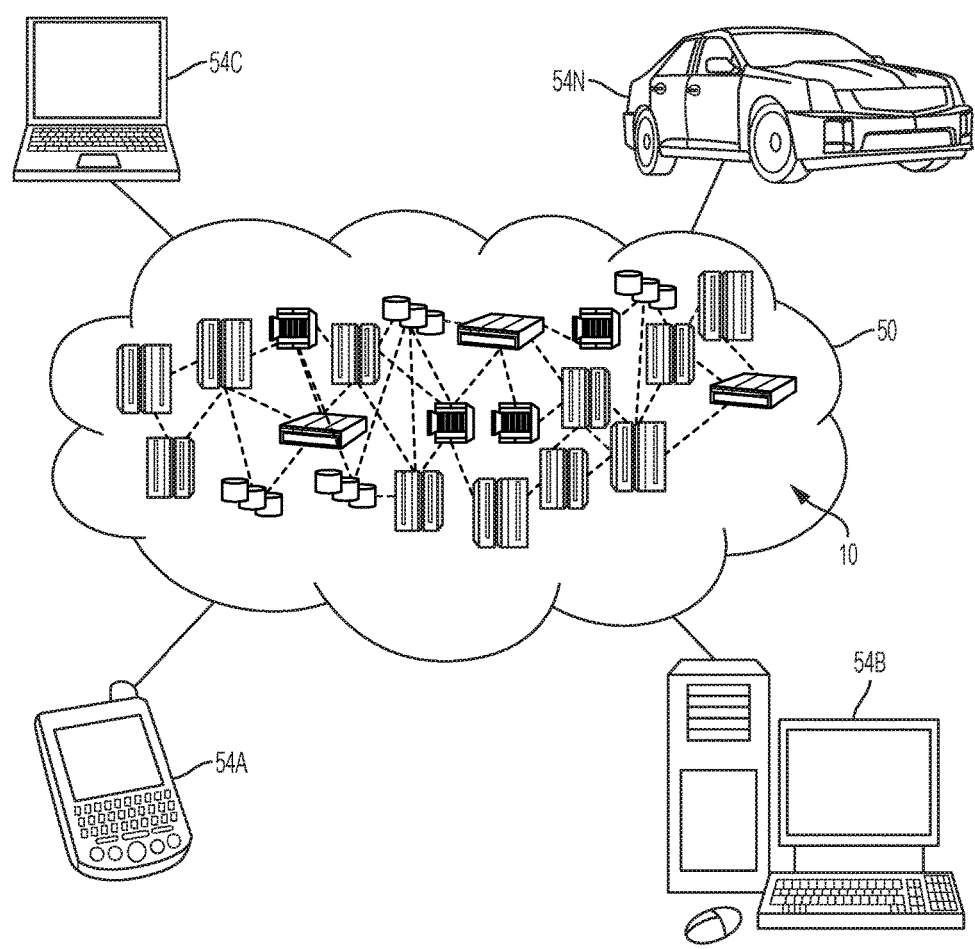
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
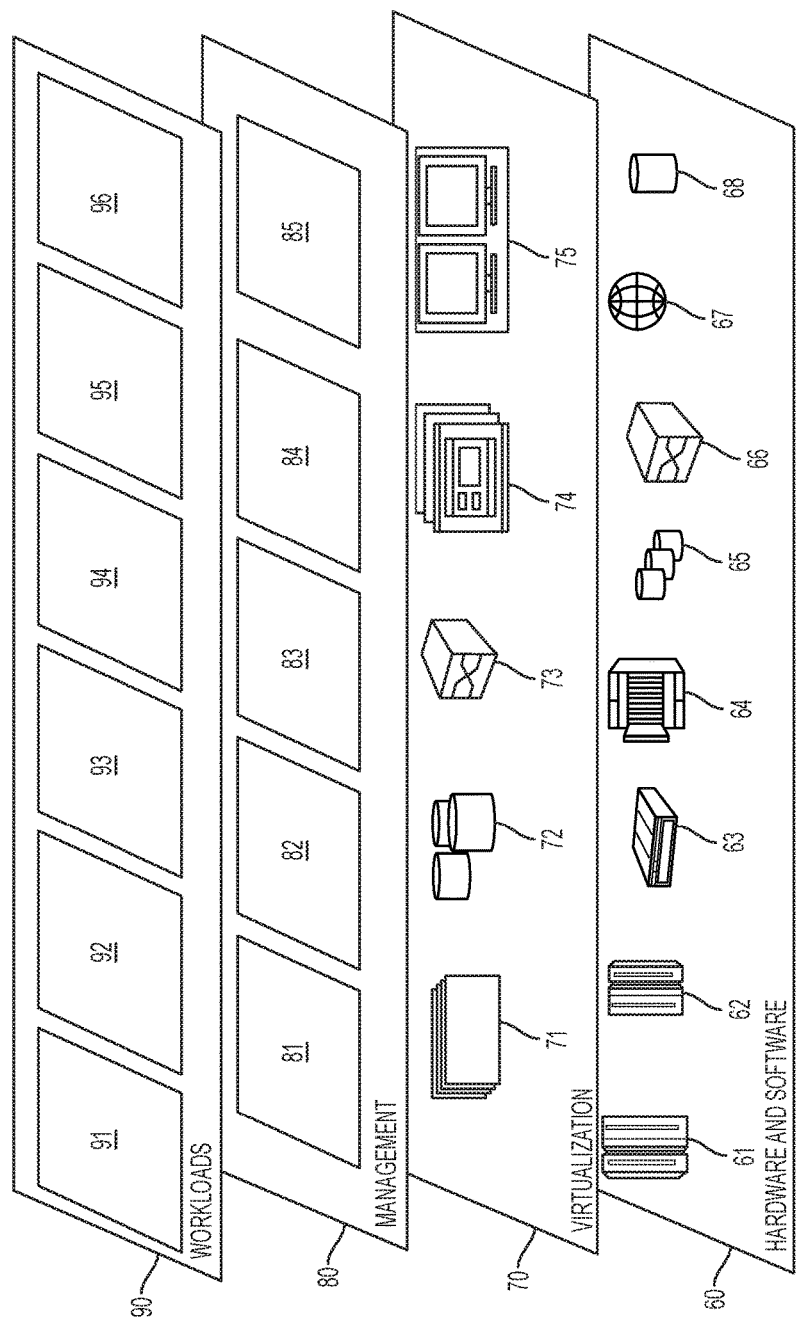
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aggregating and digitally compressing multiple electronic events for network transmission.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A specialized network delivery improvement method comprising:
   receiving, by a processor of a hardware device, an Internet based event for a user;
   associating, by said processor, said Internet based event with user attributes, of said user, retrieved from a specialized network;
   determining, by said processor based on results of said associating, that said user is associated with said Internet based event;
   determining, by said processor, a functionality status of a mobile hardware device of said user, wherein results of said determining said functionality status of said mobile hardware device of said user indicate: a weak signal associated with communications between said hardware device and said mobile hardware device and a low memory status of a memory device within said mobile device;
   analyzing, by said processor via a sensor circuit of said mobile device of said user, current parameters of said user and current physical characteristics of said user;
   determining, by said processor based on results of said determining said functionality status and said analyzing said current parameters of said user and said current physical characteristics of said user, network based delivery options associated with said Internet based event for said user, wherein results of said determining said network based delivery options indicate that said Internet based event should be aggregated with additional internet based electronic events prior to delivery to said user via said mobile device;
   retrieving, by said processor from a remote database, said additional internet based electronic events;
   aggregating, by said processor, said Internet based event with additional internet based electronic events resulting in an aggregated event package;
   boosting, by said processor based on said functionality status, a signal strength of said mobile device;
   clearing, by said processor based on said functionality status, a portion of said memory device of said mobile device; and
   transmitting, by said processor to said mobile device via said specialized network in response to said boosting and said clearing, said aggregated event package.

2. The method of claim 1, wherein said current parameters of said user comprise: current mood parameters of said user, a current geographical location of said user, and current vital sign readings of said user.

3. The method of claim 1, wherein said current physical characteristics of said user comprise: current monetary attributes of said user and a recent purchase history of said user.

4. The method of claim 1, wherein results of said determining said network based delivery options indicate that said Internet based event should be delivered to said user via said mobile device immediately, and wherein said method further comprises:
   transmitting, by said processor to said mobile device via said specialized network, said Internet based event.

5. The method of claim 1, wherein said aggregating comprises digitally compressing said Internet based event and additional internet based electronic events, wherein said aggregated event package comprises a digitally compressed aggregated event package; and wherein said method further comprises:
   after said transmitting, decoding, by said processor, digitally compressed aggregated event package resulting in a decoded event package for presentation to said user via said mobile device; and
   presenting, by said processor to said user, said decoded event package in combination with said current parameters and said current physical characteristics.

6. The method of claim 1, wherein results of said determining said functionality status of said mobile hardware device of said user indicate a hardware malfunction associated with said mobile device; and wherein said method further comprises:
   repairing, by said processor, said hardware malfunction.

7. The method of claim 1, further comprising:
providing at least one support service for at least one of creating, integrating, hosting, maintaining, and deploying computer-readable code in the hardware device, said code being executed by the computer processor to implement: said receiving, said associating, said determining that said user is associated with said Internet based event, said determining said functionality status, said analyzing, and said determining said network based delivery options.

8. A computer program product, comprising a computer readable hardware storage device storing a computer readable program code, said computer readable program code comprising an algorithm that when executed by a processor of a hardware device implements a specialized network delivery improvement method, said method comprising:
receiving, by said processor, an Internet based event for a user;
associating, by said processor, said Internet based event with user attributes, of said user, retrieved from a specialized network;
determining, by said processor based on results of said associating, that said user is associated with said Internet based event;
determining, by said processor, a functionality status of a mobile hardware device of said user, wherein results of said determining said functionality status of said mobile hardware device of said user indicate: a weak signal associated with communications between said hardware device and said mobile hardware device and a low memory status of a memory device within said mobile device;
analyzing, by said processor via a sensor circuit of said mobile device of said user, current parameters of said user and current physical characteristics of said user;
determining, by said processor based on results of said determining said functionality status and said analyzing said current parameters of said user and said current physical characteristics of said user, network based delivery options associated with said Internet based event for said user, wherein results of said determining said network based delivery options indicate that said Internet based event should be aggregated with additional internet based electronic events prior to delivery to said user via said mobile device;
retrieving, by said processor from a remote database, said additional internet based electronic events;
aggregating, by said processor, said Internet based event with additional internet based electronic events resulting in an aggregated event package;
boosting, by said processor based on said functionality status, a signal strength of said mobile device;
clearing, by said processor based on said functionality status, a portion of said memory device of said mobile device; and
transmitting, by said processor to said mobile device via said specialized network in response to said boosting and said clearing, said aggregated event package.

9. The computer program product of claim 8, wherein said current parameters of said user comprise: current mood parameters of said user, a current geographical location of said user, and current vital sign readings of said user.

10. The computer program product of claim 8, wherein said current physical characteristics of said user comprise: current monetary attributes of said user and a recent purchase history of said user.

11. The computer program product of claim 8, wherein results of said determining said network based delivery options indicate that said Internet based event should be delivered to said user via said mobile device immediately, and wherein said method further comprises:
transmitting, by said processor to said mobile device via said specialized network, said Internet based event.

12. The computer program product of claim 8, wherein said aggregating comprises digitally compressing said Internet based event and additional internet based electronic events, wherein said aggregated event package comprises a digitally compressed aggregated event package; and wherein said method further comprises:
after said transmitting, decoding, by said processor, digitally compressed aggregated event package resulting in a decoded event package for presentation to said user via said mobile device; and
presenting, by said processor to said user, said decoded event package in combination with said current parameters and said current physical characteristics.

13. The computer program product of claim 8, wherein results of said determining said functionality status of said mobile hardware device of said user indicate a hardware malfunction associated with said mobile device; and wherein said method further comprises:
repairing, by said processor, said hardware malfunction.

14. A hardware device comprising a processor coupled to a computer-readable memory unit, said memory unit comprising instructions that when executed by the processor implements a specialized network delivery improvement method comprising:
receiving, by said processor, an Internet based event for a user;
associating, by said processor, said Internet based event with user attributes, of said user, retrieved from a specialized network;
determining, by said processor based on results of said associating, that said user is associated with said Internet based event;
determining, by said processor, a functionality status of a mobile hardware device of said user, wherein results of said determining said functionality status of said mobile hardware device of said user indicate: a weak signal associated with communications between said hardware device and said mobile hardware device and a low memory status of a memory device within said mobile device;
analyzing, by said processor via a sensor circuit of said mobile device of said user, current parameters of said user and current physical characteristics of said user;
determining, by said processor based on results of said determining said functionality status and said analyzing said current parameters of said user and said current physical characteristics of said user, network based delivery options associated with said Internet based event for said user, wherein results of said determining said network based delivery options indicate that said Internet based event should be aggregated with additional internet based electronic events prior to delivery to said user via said mobile device;
retrieving, by said processor from a remote database, said additional internet based electronic events;
aggregating, by said processor, said Internet based event with additional internet based electronic events resulting in an aggregated event package;
boosting, by said processor based on said functionality status, a signal strength of said mobile device;

clearing, by said processor based on said functionality status, a portion of said memory device of said mobile device; and transmitting, by said processor to said mobile device via said specialized network in response to said boosting and said clearing, said aggregated event package.

* * * * *